July 7, 1936.   H. E. WARREN   2,046,982

OIL TRAP FOR SEALED LUBRICATION CHAMBERS

Filed April 13, 1934

Inventor:
Henry E. Warren,
by Harry E. Dunham
His Attorney

Patented July 7, 1936

2,046,982

UNITED STATES PATENT OFFICE 2,046,982

OIL TRAP FOR SEALED LUBRICATION CHAMBERS

Henry E. Warren, Ashland, Mass., assignor to Warren Telechron Company, a corporation of Maine Application April 13, 1934, Serial No. 720,431

1 Claim. (Cl. 74—606)

My invention relates to an oil trap for sealed lubrication chambers and to a method of inserting oil in such chambers. In a common form of small electric motor now used extensively for driving clocks and the like, the motor rotor together with a speed-reducing gear train are contained in a sealed chamber containing a small quantity of lubricating oil as exemplified in my United States Patent No. 1,495,936, May 27, 1924. The oil is placed in the chamber by the manufacturer before the casing is sealed and is intended to last for the life of the motor.

Where such motors are subjected to any appreciable change in temperature either during shipment or in normal use, difficulties have arisen due to the fact that temperature changes cause the motor chamber to breathe, i. e., air is forced out about the terminal shaft which extends through the wall of the sealed chamber as the temperature of the motor rises and air is drawn in when the motor cools again. During normal operation, the terminal-shaft bearing is lubricated with the oil contained in the chamber. During shipment and handling, it is likely that the inner end of this terminal-shaft bearing will be flooded with the oil. Under such circumstances, oil is forced out of the chamber about the terminal shaft during the breathing process and is lost. This loss of oil is detrimental for various reasons. For example, the escaped oil creeps or runs to other parts of the apparatus with which the motor is associated, such, for example, as clock dials, and discolors the same. The loss of oil may be sufficient to materially shorten the otherwise useful life of the motor due to lack of lubrication as no provision was made for replenishing the lubricating oil.

The present invention has for its object the overcoming of the above mentioned difficulties and the provision of means whereby the oil in such sealed chambers may be replenished in a simple manner.

In carrying my invention into effect, I provide the sealed chamber with a combined breathing vent and oil trap communicating with the bearing of the terminal shaft. In case air and oil are forced out of the chamber for any reason, the oil is retained in this trap and is drawn into the chamber again during any subsequent inhaling part of the breathing phenomenon. This oil trap is easily accessible from the outside of the chamber and, in case it becomes desirable to add new oil to the chamber, it is placed in this trap. By artificially heating and cooling the chamber, this new oil will then be sucked into the chamber.

Figure 2:
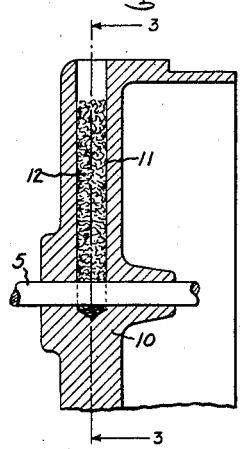
Figure 3:
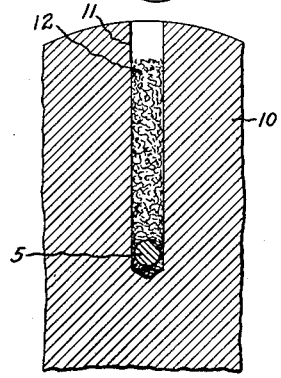
Figure 4:
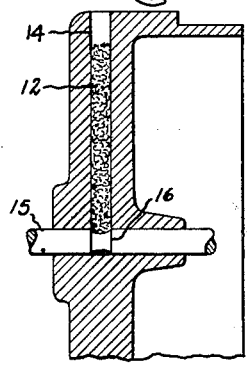

The features of my invention which are believed to be new and patentable will be pointed out in the claim appended hereto. For a better understanding of my invention, reference is made in the following description to the accompanying drawing, Fig. 1 of which illustrates a sectional view through a motor drive and gear casing of the general character to which my invention is particularly suited; Fig. 2, is an enlarged view of that end of such a gear casing through which the drive shaft extends showing the application of my invention thereto; Fig. 3 is a sectional view of a portion of the trap taken at right angles to Fig. 2; and Fig. 4 is another modification of the invention.

Figure 1:
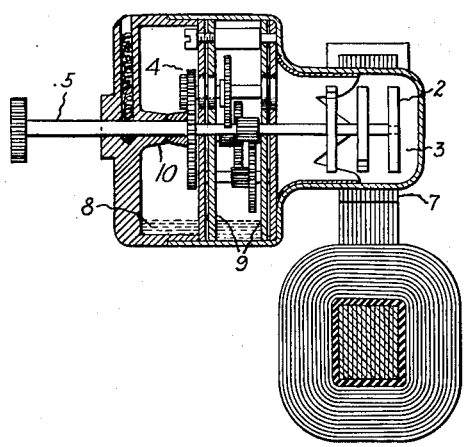

Fig. 1 may be taken to represent a reproduction of Fig. 1 of my United States Patent No. 1,495,936, May 27, 1924, as modified by the present invention. Motor drives of the construction of my prior patent are in common use. In this type of motor drive, the rotor 2 of an electric motor is mounted in a closed chamber 3 at one end of a speed-reducing gear train represented at 4. The low speed end of the gear train drives a terminal shaft 5, which extends through a bearing in the end wall of the chamber for conveying motion to or from the rotary parts in the casing. The stator 7 of the motor embraces the rotor end of the chamber and produces a rotating magnetic field, which acts through the walls of the chamber 3 to drive the rotor. The chamber is thus completely sealed except for the necessary clearance about the terminal shaft through the bearing.

Usually, the speed of the motor rotor is synchronous at 3600 revolutions per minute and this speed is generally reduced to one revolution per minute at the terminal shaft by the reduction gearing.

A small quantity of thin lubricating oil represented at 8 is contained in the gear chamber. The oil level must be kept below the general level of the gear train as otherwise the damping effect of the high-speed gears running in oil would interfere with proper motor operation since in most cases these motors are used as timing devices where accurate speed is essential. Double plates 9 support the gear train and dip into the oil reservoir. As a consequence, oil is conveyed to the various moving parts by rising between the plates due to capillary action. This oil finds its way to all parts that require lubrication including the terminal-shaft bearing.

It is intended that the lubricant which is placed in the chamber when the motor is manufactured will last throughout the useful life of the motor and that the device will never need to be oiled by the user. In many cases, the prior arrangement has been quite satisfactory but, in other cases, trouble has arisen due primarily to the fact that the motor is used in places where there is considerable temperature variation. With an increase in temperature, the oil which surrounds the terminal shaft is forced out with the expanding air in the otherwise hermetically sealed chamber and, when the device is cooled again, this oil, except the small amount remaining about the shaft, is not drawn back into the chamber with the air, but is lost. The terminal-shaft bearing is improperly lubricated at times. Also, the escape of oil is undesirable because it is apt to dirty and discolor other objects and parts of the complete device, such as clock dials, where the motor is used to drive a clock for example. Thus, this breathing action due to temperature changes and the consequent loss of oil, has frequently been a source of annoyance followed by failure of the motor due to lack of lubrication, and it is the purpose of the present invention to remove this difficulty in an otherwise very satisfactory device. This is accomplished by providing an oil trap communicating with the terminal shaft near the point where it passes out of the gear chamber. I do not attempt to prevent the breathing action but, rather, I provide a trap through which the breathing action occurs, which trap will allow the air to escape while retaining any oil that may be forced out of the gear casing. When air is again drawn into the casing, this trapped oil returns with the air.

The preferred arrangement is represented more in detail in Fig. 2. The end wall 10 of the gear casing through which the low-speed terminal shaft 5 extends is made sufficiently thick so that a bore hole 11 may be drilled from the upper edge to a point just below the shaft 5 and in line with the shaft. This hole is of slightly larger diameter than shaft 5 so that, at the point where it intersects the shaft opening, there is a free space completely surrounding the shaft 5 as represented in Fig. 3. The bore 11 is preferably nearly filled with waste 12 or other suitable absorbent material that will allow free passage of the air, keep out dirt, and act as an absorbent for oil. It is evident that any air that attempts to escape from the gear casing through the terminal-shaft bearing will find a freer passage out through bore 11 than it will through the shaft opening from this point outward because, obviously, at the intersection of bore 11 and the shaft opening, there is a recess at atmospheric pressure completely surrounding the shaft and communicating with the outer atmosphere. Consequently, no oil will be forced out of the chamber about the terminal shaft 5 beyond the trap but will remain in the trap, i. e., in the bore 11, until such time as air is again drawn into the chamber when any excess oil in the trap adjacent the shaft will be returned to the gear casing and a slight amount of oil will be retained in the absorbent material 12 and in the bottom of the trap and assures proper lubrication of the terminal-shaft bearing at all times.

The capacity of the trap is more than sufficient to take care of the maximum quantity of oil likely to be forced out of the casing at any one time. The oil is, therefore, not lost and is no longer a nuisance due to creepage over parts external to the gear casing. At any time it is desirable to add oil to the gear casing after its assembly, oil may be added by inserting it into the trap through the top opening. Subsequent breathing action will draw this oil into the gear chamber and, if it seems desirable, the motor device may be artificially heated and cooled a few times to accelerate this result.

Fig. 4 represents an equivalent arrangement where the bore 14 is of less diameter than the terminal shaft 15. The shaft 15 is slightly undercut, as at 16, opposite the trap so that there is a free space always at atmospheric pressure completely surrounding the shaft and communicating with the bore 14. The shaft from the trap outward receives a small amount of oil in a normal manner but no longer is there pressure forcing the oil out of this shaft opening.

The porous material 12 contained in the bore preferably does not extend to the top outer end of the opening or bore 11 since it is preferable to leave a small space at the top of the porous material beyond which the oil does not creep due to capillary action.

In accordance with the provisions of the patent statutes, I have described the principle of operation of my invention together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

A gear casing which is hermetically sealed except for a shaft opening through a side wall thereof, a shaft extending through said opening and having a bearing fit therein, lubricating oil in said casing, means allowing the escape of air from said casing about said shaft opening without the loss of oil consisting of a recess within the side wall of said casing about the shaft and communicating with the outer atmosphere through a passageway extending upward from said shaft, and an oil absorbing material in said passageway that does not restrict the passage of air therethrough.

HENRY E. WARREN.